United States Patent
Priev et al.

(10) Patent No.: US 9,692,250 B2
(45) Date of Patent: Jun. 27, 2017

(54) SYSTEMS AND METHODS FOR SMART WIRELESS CHARGING

(71) Applicants: Avi Apriev Priev, Jerusalem (IL); Oleg Pogorelik, Lapid (IL); Shahar Porat, Geva Carmel (IL); Alex Nayshtut, Gan Yavne (IL)

(72) Inventors: Avi Apriev Priev, Jerusalem (IL); Oleg Pogorelik, Lapid (IL); Shahar Porat, Geva Carmel (IL); Alex Nayshtut, Gan Yavne (IL)

(73) Assignee: INTEL CORPORATION, Santa Clara, CA (US)

(*) Notice: Subject to any disclaimer, the term of this patent is extended or adjusted under 35 U.S.C. 154(b) by 208 days.

(21) Appl. No.: 14/316,912

(22) Filed: Jun. 27, 2014

(65) Prior Publication Data

US 2015/0380971 A1     Dec. 31, 2015

(51) Int. Cl.
*H02J 7/00*     (2006.01)
*H02J 7/02*     (2016.01)
(Continued)

(52) U.S. Cl.
CPC ............ *H02J 7/025* (2013.01); *H02J 7/0027* (2013.01); *H02J 7/0073* (2013.01); *H02J 50/10* (2016.02);
(Continued)

(58) Field of Classification Search
CPC ........... H02J 7/025; H02J 7/0027; H02J 7/007
(Continued)

(56) References Cited

U.S. PATENT DOCUMENTS

2009/0284220 A1* 11/2009 Toncich ............... G06K 7/0008
                                                                320/108
2010/0248622 A1*  9/2010 Lyell Kirby ......... H04B 5/0031
                                                                455/41.1
(Continued)

FOREIGN PATENT DOCUMENTS

| JP | 2012523813 | 10/2012 |
|---|---|---|
| KR | 1020130073862 | 7/2013 |
| WO | 2013055192 | 4/2013 |

OTHER PUBLICATIONS

International Search Report and Written Opinion for PCT Application No. PCT/US2015/034235 mailed Aug. 27, 2015.
(Continued)

*Primary Examiner* — Edward Tso
*Assistant Examiner* — Aaron Piggush
(74) *Attorney, Agent, or Firm* — Eversheds-Sutherland (US) LLP (57) ABSTRACT

Systems and methods for power distribution allocation are provided. A system may establish a first wireless connection between the system and a first mobile device. The system may receive a first charge request from the first mobile device comprising first mobile device information, and may identify charging system policies based at least in part on the first charge request. The system may determine a first charge program for the first mobile device based at least in part on the first charge request and the one or more charging system policies, where the first charge program comprises a power allocation of the first mobile device with respect to other mobile devices connected to the charging system. The system may wirelessly charge the first mobile device, based at least in part on the first charge program.

18 Claims, 3 Drawing Sheets

(51) Int. Cl.
*H02J 50/10* (2016.01)
*H02J 50/80* (2016.01)

(52) U.S. Cl.
CPC ....... *H02J 50/80* (2016.02); *H02J 2007/0098* (2013.01)

(58) Field of Classification Search
USPC .......................... 320/108, 109, 114, 115, 134
See application file for complete search history.

(56) References Cited

U.S. PATENT DOCUMENTS

| | | | | |
|---|---|---|---|---|
| 2010/0253281 A1* | 10/2010 | Li | .......................... | H02J 7/0027 320/108 |
| 2011/0043163 A1 | 2/2011 | Baarman | | |
| 2011/0043327 A1* | 2/2011 | Baarman | ................ | H02J 5/005 340/5.8 |
| 2013/0076299 A1* | 3/2013 | Chao | .................... | H02J 7/0004 320/106 |
| 2014/0285145 A1* | 9/2014 | Patro | ...................... | H02J 7/025 320/108 |

OTHER PUBLICATIONS

Search Report for Taiwanese Patent Application No. TW104116802, completed Dec. 6, 2016, 2 pages (1 pages English translation).

* cited by examiner

SYSTEMS AND METHODS FOR SMART WIRELESS CHARGING

TECHNICAL FIELD

This disclosure generally relates to charging systems, and more particularly to systems and methods for smart wireless charging.

BACKGROUND

Mobile devices have become an integral part of the computing landscape. As mobile devices become more capable they have shifted to perform tasks that have traditionally been performed by non-mobile computers. In one example, mobile devices may have the ability to stream media, display videos, or otherwise process large amounts of data over the course of a day. The increasing use of mobile devices by consumers, along with the high dynamic range of power consumption across mobile devices, may cause certain components of the mobile device to wear down, such as the battery or power source. In some instances, certain applications of mobile devices may consume large portions of the battery powering the mobile device, resulting in a frequent need to charge the mobile device. Consumers may also have multiple mobile devices needing to be charged, but may only have a limited amount of time to do so. Charging systems, however, may not optimally charge mobile devices connected to the charging system. Accordingly, systems and methods for smart wireless charging may be desired.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE DISCLOSURE

Embodiments of the disclosure are described more fully hereinafter with reference to the accompanying drawings, in which example embodiments of the disclosure are shown. This disclosure may, however, be embodied in many different forms and should not be construed as limited to the example embodiments set forth herein; rather, these embodiments are provided so that this disclosure will be thorough and complete, and will fully convey the scope of the disclosure to those skilled in the art. Like numbers refer to like, but not necessarily the same or identical, elements throughout.

Example embodiments of the disclosure may provide systems and methods for power distribution allocation to mobile devices, such as, but not limited to, mobile communication devices, laptops, smartphones, tablets, internet of things devices, such as appliances, wearables (including headsets, watches, health monitors, etc.) or other mobile devices. Example embodiments may include one or more mobile devices wirelessly connected to a wireless charging system. The charging system may be configured to wirelessly charge, or provide power defined as energy per unit time, to connected mobile devices. For example, the charging system may implement or otherwise include magnetic resonance technology to wirelessly charge, or distribute power, to connected mobile devices. However, the charging system may have a limited charging capacity. In instances where there is congestion at the charging system, such as a high demand for charging by one or more devices connected to the charging system, the charging system may not be optimized for efficient wireless charging for the connected devices. Situations may arise where certain mobile devices may be incompletely or partially charged, or charging of certain devices may be delayed. The charging systems of the present disclosure provide optimized smart or wireless charging, resulting in improved user experience at the charging system as users may designate priority for charging desired devices. Other forms of wireless charging may be utilized, examples of which are described herein and include, but are not limited to, capacitive charging, inductive charging, and other wireless charging methods.

The charging system may determine a charge program to charge connected mobile devices based at least in part on a charge request received from the mobile device and one or more charging system policies of the charging system. The charging system policies may include or be associated with one or more charging rules, such as rules associated with power allocation, priority ranking, or mobile device authentication, which may be stored and/or retrieved from a charging system user, such as an Information Technology manager or charging system owner. The charging system may determine specific charge programs for each connected mobile device based at least in part on one or more of the charge requests received from each connected mobile device, where charge requests may include mobile device information, and/or requests for power allotment. Mobile device information received by the charging system may include, for example, runtime context such as current applications running on the mobile device (including in some embodiments central processing unit (CPU) utilization information), current battery charge levels, available time for charging, mobile device identifiers, user identifiers, or other mobile device identification and/or specification information. The charging system may wirelessly charge connected mobile devices based at least in part on the determined charge program for each connected mobile device. The charging system may periodically refresh or modify charge programs based on responses to updated mobile device information from connected mobile devices.

According to certain example embodiments of the disclosure, the charging system may optimize use of the available charging capacity of the charging system and efficiently charge connected mobile devices by prioritizing charging of certain mobile devices, such that prioritized mobile devices receive, or are allocated, a disproportionate amount of power from the charging system. For example, mobile devices with limited charge capacity may need less energy or power than mobile devices with greater charge capacity. However, in some cases mobile devices with limited charge capacity may receive a maximum acceptable charge that is still less than energy being provided to the mobile device with greater charge capacity, leading to a disproportionate amount of power. Charging of mobile devices may be more efficient and may charge in reduced lengths of time. For example, a charging system user may define a charging system policy for mobile devices connected to the charging system. The charging system policy may include, but is not limited to, rules related to charging specific mobile device types or mobile devices with a certain runtime context (e.g., user defined prioritized applications), for example mobile devices running a particular mobile application or type/class of mobile application. In one example, the charging system policy may indicate that a smartphone connected to the charging system is to be prioritized and fully charged at a maximum receivable power at a faster charge rate or before any other type of mobile device. The charging system may therefore determine a charge program for smartphones where the smartphone receives a maximum power level until charge completion, and is prioritized with respect to other connected mobile devices that are not smartphones. In other examples, the charging system policies may indicate that mobile devices actively running a critical application(s) or other runtime context, such as a music streaming application as defined by the charging system user, are to be prioritized and charged to at least 80% before other mobile devices not running the critical application(s) are charged at a maximum charge rate. In some embodiments, in instances where the charging system is congested, power may be reallocated from lesser priority mobile devices to the higher priority mobile devices when a higher priority mobile device is added. When a lower priority device is added, power may not be reallocated unless, for example, a user overrides the charging system. The charging system policies may also indicate that mobile devices associated with specific users, such as loyalty card holders or company employees, are to be prioritized over certain other mobile devices. In some embodiments, the charging system policies may be used by the charging system to set an order of importance, a power allocation, or a priority rank for mobile devices with respect to other connected mobile devices. In some embodiments, the charging system may determine a power allocation for connected mobile devices without specifically determining a priority rank or otherwise creating an order or a charge priority.

In an illustrative embodiment, a charging system may have a total charging capacity of 15 watts. The charging system may not be charging any mobile devices, leaving an available charging capacity of 15 watts. A first mobile device user may position a smartphone at the charging system, where the smartphone is associated with the mobile device user who in this illustrative embodiment may be a member of a loyalty program managed by the charging system user. The charging system may establish a wireless connection with the smartphone through any wireless protocol, as discussed below, for example through a beacon or a handshake process, where the charging system emits a beacon and the smartphone responds to the beacon to establish a wireless connection. Once connected, the smartphone may transmit a charge request to the charging system. The charge request may include a minimum power allotment request, for example 5 watts, and a maximum power allotment request, for example 10 watts, where the minimum and maximum power allotment requests are associated with the amount of power the smartphone is capable of receiving during charging. The charge request may also include mobile device information, which may include a user identifier associated with the mobile device user, for example, the loyalty rewards member, and a mobile device identifier associated with the type of mobile device, which in this case would identify the mobile device as a smartphone. The mobile device information may also include runtime context information associated with mobile applications running on the smartphone, which may include for example streaming video, and a current battery charge level, which may be 80%.

The charging system may receive the charge request and the mobile device information from the smartphone. The charging system may identify one or more charging system policies based at least in part on the charge request. For example, based at least in part on the mobile device information received from the smartphone, the charging system may identify charging system policies associated with smartphone devices, loyalty members, active mobile applications, and battery charge levels. In one example, the charging system policy may include a charging rule associated with smartphone devices indicating that smartphones are to be charged to at least 95% at maximum charge at a maximum charge rate before other mobile devices receive maximum charge at a maximum charge rate for the respective mobile devices. The charging system policy may also include a charging rule associated with loyalty members indicating that mobile devices associated with loyalty members, regardless of type, are to be fully charged at maximum power before mobile devices belonging to non-loyalty members.

The charging system may determine a charge program for the smartphone based at least in part on the charge request and the identified charging system policy or policies. The charge program may also set a priority rank or power allocation, for example, prioritizing smartphones over other connected devices, based at least in part on the charging system policies. The charging system may wirelessly charge the smartphone based at least in part on the determined charge program. For example, the charging system may determine that since the smartphone is entitled to the highest priority charging, the smartphone should therefore receive a maximum charge until the smartphone is charged to at least 95%, at which point the charge program can be modified. In some embodiments, where no additional mobile devices are connected to the charging system, the charging system may determine a charge program for the smartphone to include 10 watts, the maximum power receivable by the smartphone, until the smartphone is charged to 95%. In other embodiments, the wireless charging system may apply maximum charge rates to prioritized mobile devices along with, or independent of, maximum charge.

Further to this illustration, a second mobile device user may position a tablet computer at the charging system. The second mobile device user may not be a member of the loyalty rewards program of the charging system user. The charging system may establish a second wireless connection with the tablet computer, and the tablet computer may transmit a charge request to the charging system indicating a minimum power allotment of 5 watts and a maximum power allotment of 20 watts. The charge request may include mobile device information indicating the mobile device is a tablet computer, has a current battery charge level of 50%, and a list of running applications. The charging system may receive the charge request from the tablet computer and may identify one or more charging system policies applicable to the tablet computer. For example, the charging system may identify a charging system policy including a charging rule for mobile devices belonging to users that are not loyalty rewards members, another charging system policy associated with the mobile device type, or tablet computer in this case, and another charging system policy associated with mobile devices with runtime context indicating certain mobile applications are running. The charging system may request and receive updated mobile device information from the smartphone. Updated mobile information may include updated mobile information regarding the current charge level, the current received charge rate, and the like, as described herein. For example, the updated mobile device information may indicate the smartphone battery now has a charge level of 90%. The charging system may consider the updated mobile device information in determining the charging program for the mobile device and/or other connected mobile devices, as discussed below.

The charging system may determine a charge program for the tablet computer, based at least in part on the charge request and the identified charging system policies for the tablet computer. The charging system may also consider the updated mobile device information from the smartphone. The charge program for the tablet computer may include a priority rank for the tablet computer relative to the computer, which may be based on the charging policies for both the smartphone and the tablet computer. The charging system may determine a power allocation for the tablet computer. In this illustration, the charging policies may indicate that mobile device type policies are prioritized with respect to loyalty member policies, which are prioritized with respect to battery charge level policies. The charging system may determine that the smartphone is prioritized over the tablet computer because of the mobile device type, where the charging system policy indicates smartphones are prioritized over other mobile device types. The charging system may therefore continue providing the smartphone maximum power until the smartphone reaches 95%, or as determined by the charging policy. The charging system may then determine a charge program for the tablet computer, where the tablet computer has a lower priority level with respect to the smartphone. For example, the charge program for the tablet computer may indicate the tablet computer receives an available charge of 5 watts, calculated by subtracting the power allotted to the smartphone from the charging capacity of the charging system, until the smartphone reaches 95% charge, at which point the charge program for the tablet computer may be updated to provide maximum power to the tablet computer and the charge program for the smartphone may be updated to provide residual power to the smartphone. The charging system may wirelessly charge the tablet computer and the smartphone simultaneously.

In other instances, the charging system policies may indicate mobile devices associated with loyalty rewards members may be prioritized, or devices above a certain battery charge level threshold may not be prioritized, such as battery charge levels of 80% or greater. Other charging system policies may include charging rules based on mobile device authentication, for example, only authorized users may be allowed to charge mobile devices, minimum charge level across all or certain devices, for example, mobile devices with less than 50% charge are prioritized, available time for charging, for example if a mobile device may only be connected for a period of 10 minutes before the mobile device will be removed, or other charging rules as described herein. Additional systems and methods for smart wireless charging are described herein.

In example embodiments, the mobile devices discussed herein may have one or more antennas and/or transceivers, such as antennas and/or transceivers (e.g., radios) for wirelessly communicating with, for example, one another and/or the charging system. Sample forms of wireless communication may include WiFi, WiFi Direct™, BLUETOOTH™, BLUETOOTH LE™, Near Field Communication, and other suitable forms of wireless communication. In example embodiments, the mobile devices may be configured to wirelessly receive energy from the charging system. For example, the mobile devices may include resonators for engaging in a resonant magnetic induction energy transfer with the charging system.

It will be appreciated that in example embodiments, the systems and methods described herein may provide for and result in increased functionality for mobile devices, and/or optimal use of charging capacity for charging systems by utilizing charging policies to charge connected mobile devices.

Figure 1:
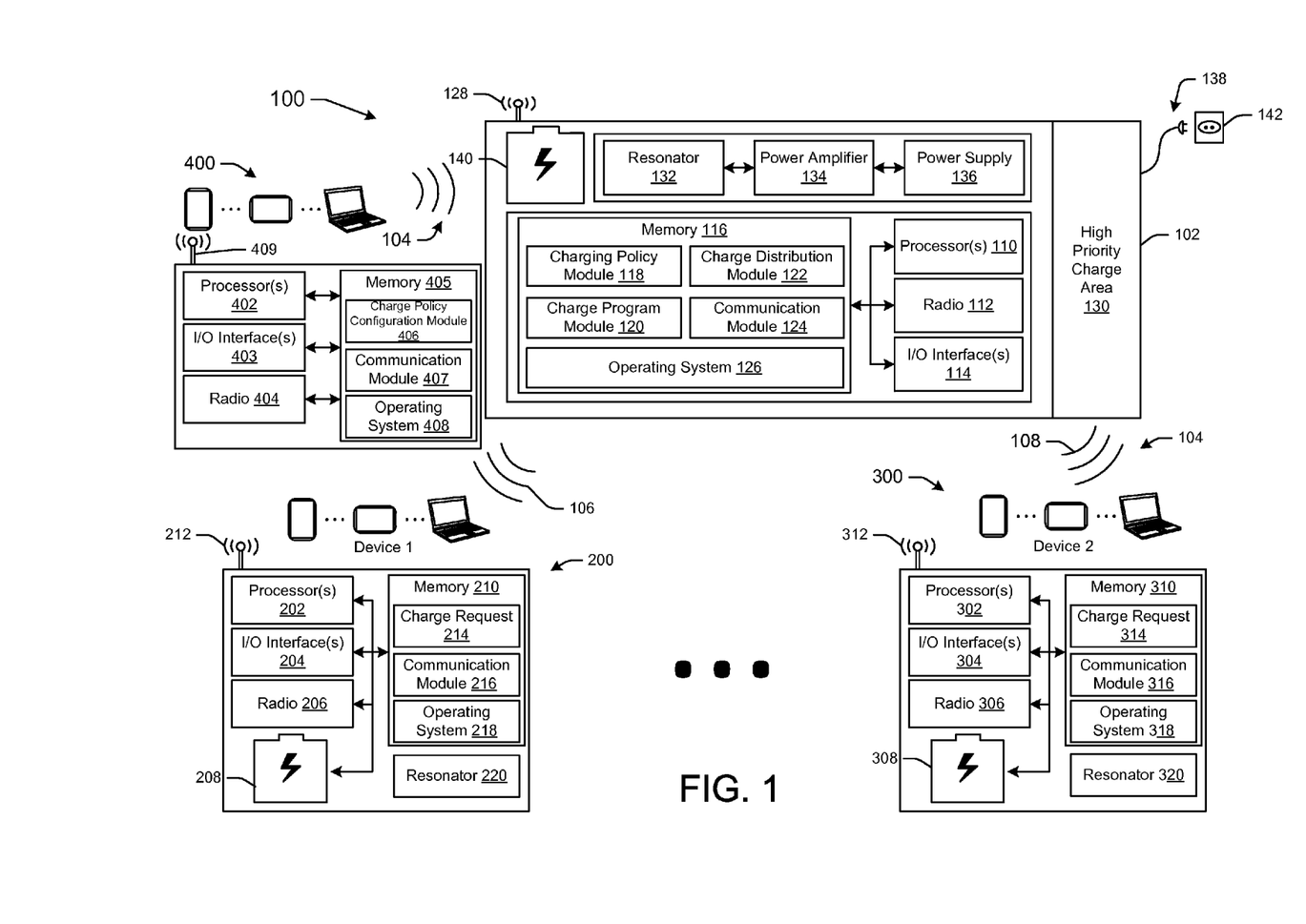
FIG. 1 is an illustrative schematic diagram of an example environment of a charging system, in accordance with example embodiments of the disclosure.

Some example elements involved in the operation of the systems, methods, and apparatus disclosed herein may be better understood with reference to the figures. Referring now to FIG. 1, FIG. 1 is a simplified schematic diagram illustrating an example charging system 100 in accordance with embodiments of the disclosure. In the illustrated embodiment, the charging system 100 includes a power transmission unit 102. FIG. 1 further depicts a first mobile device 200, a second mobile device 300, and a charging policy configurator 400. This embodiment is merely illustrative, because any number of mobile devices may be included. In some embodiments, the charging system 100 may include the charging policy configurator 400. The first mobile device 200, the second mobile device 300, and the charging policy configurator 400 may be in wireless communication 104 with the power transmission unit 102 of the charging system 100. Specifically, the first mobile device 200 may be wirelessly connected to the power transmission unit 102 via a first wireless connection 106. The second mobile device 300 may be wirelessly connected to the power transmission unit 102 via a second wireless connection 108. In other embodiments of the present disclosure, additional or fewer mobile devices and/or power transmission units may be included.

The power transmission unit 102 may be any suitable device configured to wirelessly charge connected mobile devices 200, 300. In some embodiments, the power transmission unit 102 may incorporate charging protocol established by the Alliance for Wireless Power (A4WP) standard. In the illustrated embodiment, the power transmission unit 102 includes one or more processor(s) 110, a radio 112, and an input/output interface (I/O) 114. Each component 110, 112, 114 may be communicatively coupled to a memory 116. The memory 116 includes a charging policy module 118, a charge program module 120, a charge distribution module 122, and a communication module 124. The charging policy module 118 may be configured to receive and/or store charging polices from the charging policy configurator 400. In some instances, the charging policy module 118 may be configured to receive charging policies and/or charging rules, as discussed herein, from a user of the power transmission unit 102. The charge program module 120 may be configured to determine charge programs for connected mobile devices. The charge distribution module 122 may be configured to distribute power to designated mobile devices. The communication module 124 may be configured to transmit and/or receive wireless communications as described herein. As shown, the power transmission unit 102 may include an operating system 126 in some embodiments. The operating system 126 may provide users with a guided user interface and/or may provide software logic used to control the charging system 100 and/or the power transmission unit 102. In some embodiments, one or more of the modules stored on the memory 116 of the power transmission unit 102 may be stored remotely, for example at a remote server, a web interface, or in the cloud, and the remote server may be wirelessly connected to the mobile devices and the power transmission unit 102 in order to receive and/or transmit instructions.

The power transmission unit 102 includes an antenna 128 in communication with radio 112. The power transmission unit 102 also includes a resonator 132 that may be configured to wirelessly provide or distribute power to connected mobile devices 200, 300. The power transmission unit 102 may also include a power amplifier 134 electrically coupled with a power supply 136 and the resonator 132. The power transmission unit 102 may be connected to an external power source 138 from which the power transmission unit 102 receives energy. The power transmission unit 102 may further include a battery 140 or another energy storage device configured to store power received from the external power source 138. Although each of these components is shown in the illustrated embodiment, other embodiments may include additional or fewer components. For example, the power transmission unit 102 may include capacitive charging technology, contact ultrasound or non-contact ultrasound technology, infrared technology, or other wireless power distribution technologies. The power transmission unit 102 may come in any shape, size, or form. For example, the power transmission unit 102 may be in the form of, or include, a mat or a sheet, or may be integrated into furniture such as table or desktops, walls, airplane seats, chairs, armrests, electronic devices such as laptops or computers, or other surfaces at which mobile devices are commonly placed. The power transmission unit 102 may have a designated physical location 130 that provides high priority charging to mobile devices positioned within the high priority charge area 130. For example, the power transmission unit 102 may have an edge portion designated high priority, where mobile devices positioned within the high priority edge portion receive prioritized charging. The high priority charge area 130 may include one or more indicators, for example LED lights, that indicate different priority levels across the high priority charge area 130. The one or more indicators may be color coded or may otherwise provide priority or connectivity information (e.g., one LED may be illuminated for each connected device) for the user.

The mobile devices 200, 300 may be any device configured to execute one or more applications, software, and/or instructions to provide one or more services to a charging system or mobile device user. The mobile devices 200, 300, as used herein, may be any variety of client devices, electronic devices, communications devices, and/or other user devices. The mobile devices 200, 300 may include, but are not limited to, tablet computing devices, electronic book (ebook) readers, netbook computers, Ultrabook™, notebook computers, laptop computers, desktop computers, watches or other wearables, health monitors, personal digital assistants (PDA), smart phones, web-enabled televisions, video game consoles, set top boxes (STB), or the like. While the drawings and/or specification may portray the mobile devices 200, 300 in the likeness of a smartphone, tablet, or laptop computer, the disclosure is not limited to such. Indeed, the systems and methods described herein may apply to any mobile device or user device capable of communicating with and/or receiving power from the power transmission unit 102 of the charging system 100. The mobile devices may be used by users for a variety of purposes, including, but not limited to, functionality such as web browsing, business functions, communications, graphics, word processing, publishing, spreadsheets, databases, gaming, education, entertainment, media, project planning, engineering, drawing, or combinations thereof.

In the illustrated embodiment, the first mobile device 200 includes one or more processor(s) 202, an input/output interface 204, a radio 206, and a battery 208. Each component 202, 204, 206, 208 may be communicatively coupled to a memory 210. The first mobile device 200 further includes an antenna 212 in communication with radio 206. The memory 210 includes a charge request application 214, a communication module 216, and an operating system 218. The charge request application 214 may be a mobile application stored on memory 210 and may be configured to retrieve or determine mobile device information associated with the first mobile device 200, as well as determine charge requests to be transmitted by the first mobile device 200 to the charging system 100, for example. The communication module 216 may be configured to transmit and/or receive electronic communications. The operating system 218 may provide users with a guided user interface and/or may provide software logic used to control the first mobile device 200. The first mobile device 200 may also include a resonator 220 configured to receive resonant magnetic inductive energy wirelessly from the power transmission unit 102 of the charging system 100, and may be further configured to charge the battery 208 of the first mobile device 200, as described herein. Although each of these components is shown in the illustrated embodiment, other embodiments may include additional or fewer components. In other embodiments, the first mobile device 200 may include components necessary to receive and store other forms of wirelessly communicated energy, such as capacitive charging.

Similarly, the second mobile device 300 includes one or more processor(s) 302, an input/output interface 304, a radio 306, and a battery 308. Each component 302, 304, 306, 308 may be communicatively coupled to a memory 310. The second mobile device 300 further includes an antenna 312 in communication with radio 306. The memory 310 includes a charge request application 314, a communication module 316, and an operating system 318. The charge request application 314 may be a mobile application stored on memory 310 and may be configured to retrieve or determine mobile device information associated with the second mobile device 300, as well as determine charge requests to be transmitted by the second mobile device 300 to the charging system 100, for example. The communication module 316 may be configured to transmit and/or receive electronic communications. The operating system 318 may provide users with a guided user interface and/or may provide software logic used to control the second mobile device 300. The second mobile device 300 may also include a resonator 320 configured to receive resonant magnetic inductive energy wirelessly from the power transmission unit 102 of the charging system 100, and may be further configured to charge the battery 308 of the second mobile device 300, as described herein. Although each of these components is shown in the illustrated embodiment, other embodiments may include additional or fewer components. In other embodiments, the second mobile device 300 may include components necessary to receive and store other forms of wirelessly communicated energy, such as capacitive charging.

The charging policy configurator 400 may be any suitable electronic device, interface, or application configured to allow charging system users to create, implement, or otherwise modify charging policies and/or charging rules as described herein. The charging policy configurator 400 may be remote or local to the charging system 100 and may be accessible by any charging system user or access may be restricted to certain personnel such as employees or paying customers. In one embodiment, the charging policy configurator 400 may be a remote computer managed by an Information Technology manager, while in other embodiments, the charging policy configurator 400 may be included in the memory 116 of the power transmission unit 102. The charging policy configurator 400 may include a user interface or operating system 408 configured to allow users to configure and/or customize aspects of the charging system 100, for example by setting charging rules, priority levels or ranks, and/or charging policies or making other modifications to the charging system 100. The charging policy configurator 400 may include hardware suitable to facilitate communication with, for example, the power transmission unit 102 via the charging policy module 118. Changes made to charging policies at the charging policy configurator 400 may be pushed to the power transmission unit 102, or the charging policy module 118 of the power transmission unit 102 may periodically request updates from the charging policy configurator 400. The charging policy configurator 400 may include memory 405, on which the operating system 408, as we as a communication module 407 and a charge policy configuration module 406, are stored. The charging policy configurator 400 may also include one or more processors 402, input/output interfaces (I/O) 403, radio 404, and antenna 409.

Each respective processor 110, 202, 302 of the power transmission unit 102 or mobile devices 200, 300 may be implemented as appropriate in hardware, software, firmware, or combinations thereof. Software or firmware implementations of the processors 110, 202, 302 may include computer-executable or machine-executable instructions written in any suitable programming language to perform the various functions described. Hardware implementations of the processors 110, 202, 302 may be configured to execute computer-executable or machine-executable instructions to perform the various functions described. The processors 110, 202, 302 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The power transmission unit 102 and/or mobile devices 200, 300 may also include a chipset (not shown) for controlling communications between one or more processors 110, 202, 302 and one or more of the other components of the power transmission unit 102 or mobile devices 200, 300. The processors 110, 202, 302 may also include one or more application specific integrated circuits (ASICs) or application specific standard products (ASSPs) for handling specific data processing functions or tasks. In certain example embodiments, the power transmission unit 102 and/or mobile devices 200, 300 may be based on an Intel® Architecture system and the processors 110, 202, 302 and chipset may be from a family of Intel® processors and chipsets, such as the Intel® Atom® processor family.

The input/output interfaces 114, 204, 304 included in the power transmission unit 102 and mobile devices 200, 300 may enable the use of one or more user interfaces for receiving user input and/or providing output to the user. A user may be able to administer or manage the systems and methods disclosed herein by interacting with the power transmission unit 102 or mobile devices 200, 300 via the input/output interfaces 114, 204, 304, such as a touchscreen interface, a display, a guided user interface, or any other input/output interface. The input/output interfaces 114, 204, 304 may be in the form of a touch screen, microphone, accelerometer sensor, speaker, or any other suitable input/output interfaces 114, 204, 304 that may be used by the user to interact with the power transmission unit 102 or mobile devices 200, 300.

The memory 116 of the power transmission unit 102, as well as the memory 210, 310 of the first mobile device 200 and second mobile device 300, respectively, may include one or more volatile and/or non-volatile memory devices including, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory 116 of the power transmission unit 102, as well as the memory 210, 310 of the first mobile device 200 and second mobile device 300, respectively, may store program instructions that are loadable and executable on each respective processor 110, 202, 302, as well as data generated or received during the execution of these programs. Turning to the contents of each memory 116, 210, 310 in more detail, each memory 116, 210, 310 may include several modules. Each of the modules and/or software may provide functionality for the power transmission unit 102 or mobile devices 200, 300, when executed by the processors 110, 202, 302. The modules and/or the software may or may not correspond to physical locations and/or addresses in each memory 116, 210, 310. In other words, the contents of each of the modules may not be segregated from each other and may, in fact be stored in at least partially interleaved positions on each memory 116, 210, 310.

The memory 116, 210, 310 of the respective power transmission unit 102, first mobile device 200 and second mobile device 300 includes a respective operating system 126, 218, 318. The processor 110, 202, 302 of the power transmission unit 102 or corresponding mobile device 200, 300 may each be configured to access and execute one or more operating systems stored in the respective operating systems 126, 218, 318 to operate the system functions of the electronic device. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The memory 116, 210, 310 of the respective power transmission unit 102, first mobile device 200, and second mobile device 300 includes a respective communication module 124, 216, 316. Each communication module 124, 216, 316 may contain instructions and/or applications thereon that may be executed by each respective processor 110, 202, 302 to provide one or more functionality associated with the directional distribution and reception of wireless signals and task processing. These instructions and/or applications may, in certain aspects, interact with each respective operating system 126, 218, 318 and/or other modules of the power transmission unit 102 and/or mobile devices 200, 300. Each communication module 124, 216, 316 may have instructions, software, and/or code stored thereon that may be launched and/or executed by the processors 110, 202, 302 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof.

The radios 112, 206, 306 of the power transmission unit 102 and/or mobile devices 200, 300 may be a transmit/receive component, such as a transceiver. The radios 112, 206, 306 may include any suitable radio(s) and/or transceiver(s) for transmitting and/or receiving radio frequency (RF) signals in the bandwidth and/or channels corresponding to the communications protocols utilized by the mobile devices 200, 300 to communicate with each other or with other user devices and/or the power transmission unit 102 or another component of the charging system 100. The radios 112, 206, 306 may include hardware and/or software to modulate communications signals according to pre-established distribution protocols. The radios 112, 206, 306 may further have hardware and/or software instructions to communicate via one or more Wi-Fi and/or Wi-Fi direct protocols, as standardized by the Institute of Electrical and Electronics Engineers (IEEE) 802.11 standards. In certain embodiments, the radios 112, 206, 306, in cooperation with their respective antennas 128, 212, 312 may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In alternative embodiments, non-Wi-Fi protocols may be used for communications between the power transmission unit 102 and/or mobile devices 200, 300, such as BLUETOOTH™, BLUETOOTH™ LE, Near Field Communication, dedicated short-range communication (DSRC), or other packetized radio communications. The radios 112, 206, 306 may include any known receiver and baseband suitable for communicating via the communications protocols of the power transmission unit 102 and/or mobile devices 200, 300. The radios 112, 206, 306 may further include a low noise amplifier (LNA), additional signal amplifiers, an analog-to-digital (A/D) converter, one or more buffers, and digital baseband.

The antenna 128, 212, 312 included in the power transmission unit 102 and respective mobile devices 200, 300 may be configured for receiving and/or transmitting communications signals from/to each other or other components of the charging system 100, such as charging policy configurator 400 directly or indirectly. The antennas 128, 212, 312 may be any suitable type of antenna corresponding to the communications protocols used by the power transmission unit 102 and/or mobile devices 200, 300 for the particular signals received and/or transmitted via the antennas 128, 212, 312. Some non-limiting examples of suitable antennas 128, 212, 312 include directional antennas, non-directional antennas, dipole antennas, folded dipole antennas, patch antennas, multiple-input multiple-output (MIMO) antennas, or the like. Each antenna 128, 212, 312 may be communicatively coupled to a radio component to transmit and/or receive signals, such as communications signals to and/or from the power transmission unit 102 and/or the mobile devices 200, 300.

The antennas 128, 212, 312 may be configured to receive and/or transmit signals in accordance with established standards and protocols, such as Institute of Electrical and Electronics Engineers (IEEE) 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the antennas 128, 212, 312 may be configured to receive and/or transmit non-Wi-Fi protocol signals, such as BLUETOOTH™, BLUETOOTH™ LE, Near Field Communication, dedicated short-range communication (DSRC), or other packetized radio communications.

Each mobile device 200, 300, as well as power transmission unit 102, may include an energy storage device, such as battery 140, 208, 308. Each battery 140, 208, 308 may be configured to provide energy or otherwise power each respective mobile device 200, 300. The batteries 140, 208, 308 may be any suitable type of battery including, but not limited to, wet cells, dry cells, lead-acid, lithium, lithium hydride, lithium ion, or the like, at any suitable voltage and/or output current. In certain embodiments, the batteries 140, 208, 308 may be rechargeable and may be recharged by one or more other power sources, such as the power transmission unit 102. Each battery 140, 208, 308 may be configured to receive and store energy.

The power transmission unit 102 and each mobile device 200, 300 may include a respective resonator 132, 220, 320. Each resonator 132, 220, 320 may be any suitable resonator configured to provide, distribute, transmit, or receive energy. For example, the resonator 132 of the power transmission unit 102 may be configured to transmit, emit, or otherwise transfer energy wirelessly, and the resonators 220, 320 of the mobile devices 200, 300 may be configured to receive the energy transmitted by the resonator 132 of the power transmission unit 102. The resonators 132, 220, 320 may be electromagnetic resonators in one example. The resonators 220, 320 of the mobile devices 200, 300 may be electrically coupled to each respective battery 208, 308 of the mobile devices 200, 300, and may be configured to charge, recharge, and/or provide energy to the batteries 208, 308. Other wireless charging technologies, including infrared (IR), capacitive, or other technologies may be incorporated into the power transmission unit 102.

The power transmission unit 102 may include the power amplifier 134 and power supply 136. The power amplifier 134 and the power supply 136 may be electrically coupled to the resonator 132 of the power transmission unit 102, and may energize the resonator 132 such that the resonator 132 may wirelessly transfer power. The power supply 136 may be a battery, for example battery 140, and/or may be a connection to external power source 138. The power supply 136 may further include AC/DC power conversion capabilities and/or converters. The external power source 138 may be power provided from a power outlet 142, as shown. The connection between the power transmission unit 102 and the external power supply 138 may be a standard wall outlet, a Universal Serial Bus connection, a FIREWIRE™ or LIGHTNING™ connection, or any other connection configured to deliver power to the power transmission unit 102. In some embodiments, the power supply 136 may be an intermediary between the power transmission unit 102 and the external power supply 138. The power amplifier 134 may amplify energy from the power supply 136 to ensure the resonator 132 has sufficient energy to wirelessly transmit or distribute energy. For example, the power amplifier 134 may provide current in order to generate flux, thereby inducing voltage at the resonator 132.

Figure 2:
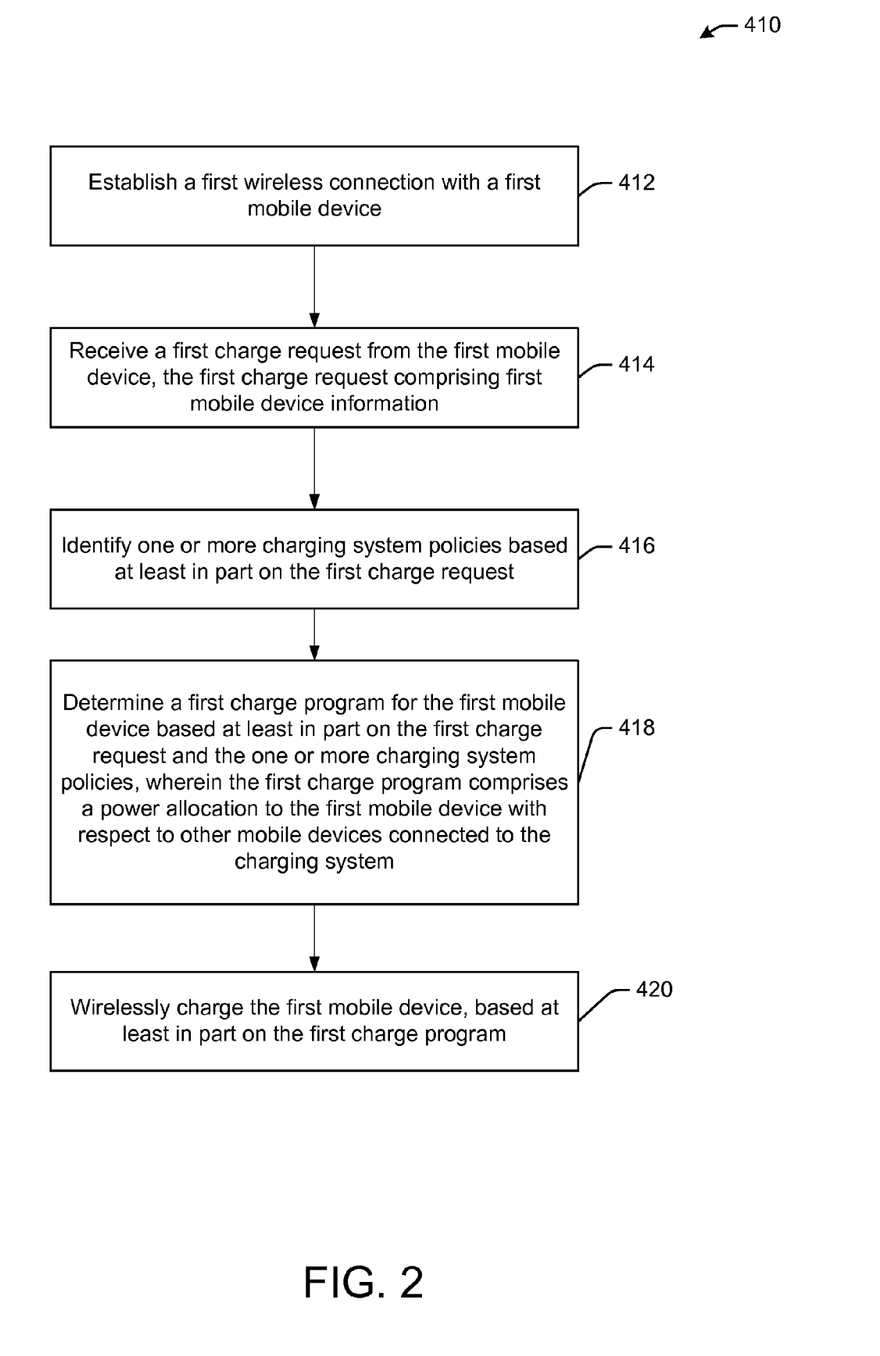
FIG. 2 is a flow diagram illustrating an example method for power distribution allocation, in accordance with certain example embodiments of the disclosure.
Figure 3:
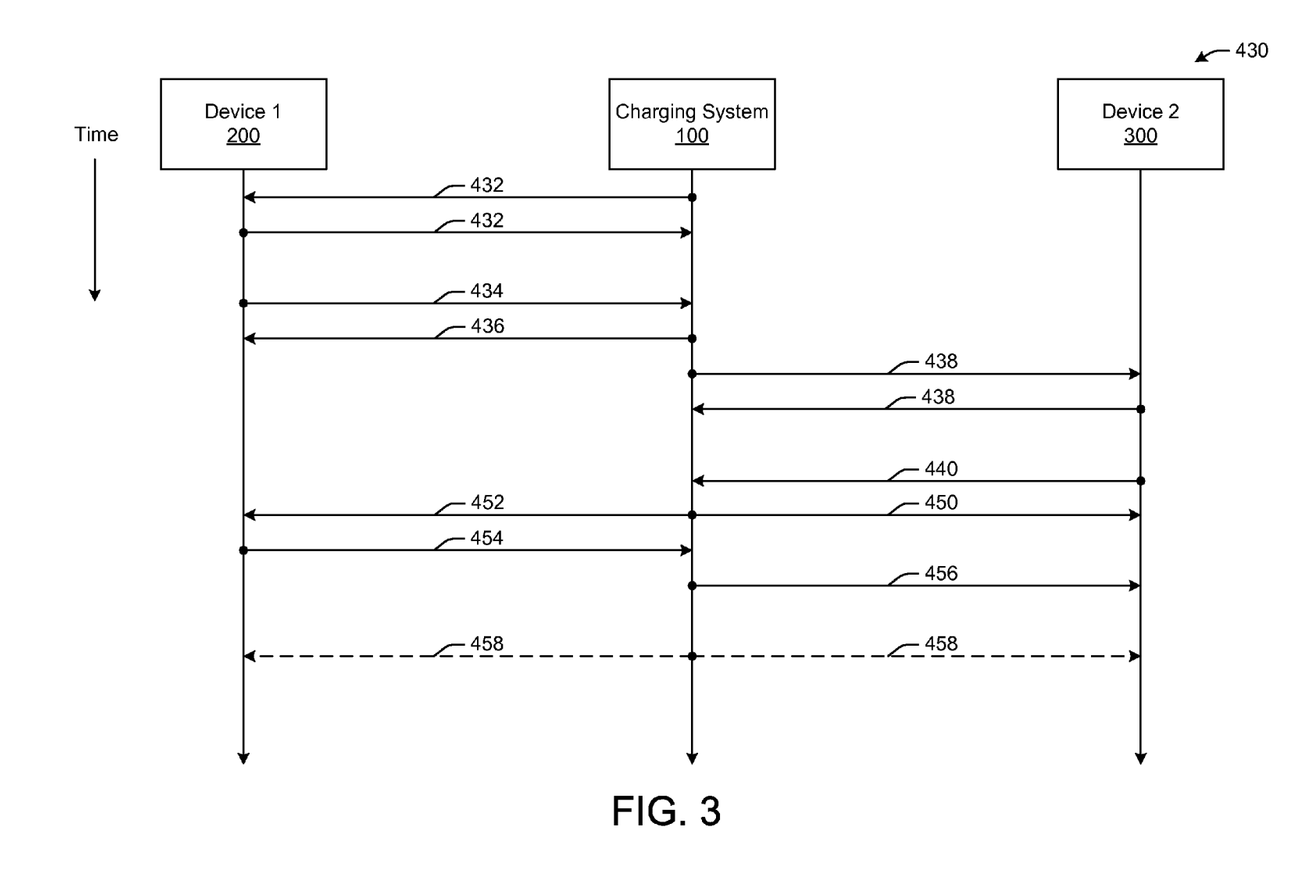
FIG. 3 is a dataflow diagram illustrating an example dataflow for the method of FIG. 2, in accordance with certain example embodiments of the disclosure.

Referring now to FIGS. 2 and 3, an example method 410 and an example data flow 430 for wireless charging according to one embodiment of the disclosure are illustrated and will be discussed in conjunction with each other. Referring first to FIG. 2, method 410 illustrates one example method for wireless charging, in accordance with one embodiment of the disclosure, that may be performed by a charging system having features disclosed herein, for example charging system 100. Referring now to FIG. 3, data flow 430 includes the first mobile device 200 in wireless communication via the first wireless connection 106 with the charging system 100 (shown in FIG. 1). Data flow 430 also includes the second mobile device 300 in wireless communication via the second wireless connection 108 with the charging system 100. FIG. 3 illustrates data flowing between the components over time, denoted on the vertical axis.

Still referring to both FIGS. 2 and 3, at block 412 of FIG. 2, the charging system 100 may establish the first wireless connection 106 between the charging system 100 and the first mobile device 200. The first wireless connection 106 may be established by any of a number of methods. For example, turning to FIG. 3, one embodiment of block 412 is illustrated by the communications and/or operations included in exchange 432. Exchange 432 may include a communication from the charging system 100, for example a beacon, to determine if any mobile devices within range wish to connect to the charging system 100. In one example, the beacon may be emitted or transmitted by the power transmission unit 102 of the charging system 100 periodically or at predetermined time intervals using any of the above-described hardware and/or the communications module 124. Still referring to exchange 432, the first mobile device 200 may receive the beacon, using any of the above-described hardware and/or the communication module 216 of the first mobile device 200. In response, the first mobile device 200 may transmit a response or confirmation to the charging system 100 during exchange 432 using communication module 216, thereby establishing the first wireless connection 106 with the charging system 100. Other methods of establishing wireless connections between the charging system 100 and mobile devices may be implemented. For example, a handshake or authentication process may be implemented. Further, any device, including the power transmission unit 102 or any of the mobile devices 200, 300 may initiate the respective wireless connections, and additional or fewer communications and/or operations may be performed in order to establish the first wireless connection 106.

At block 414 of FIG. 2, the charging system 100 may receive a first charge request from the first mobile device 200. Referring to FIG. 3, at communication 434 the first mobile device 200 may transmit the first charge request to the charging system 100 using communication module 216. The first charge request may include power allotment information, such as a minimum receivable charge or power allotment and a maximum receivable charge or power allotment, corresponding to minimum and maximum power the first mobile device 200 may receive. Power allotments of the first mobile device 200 may be based on hardware configuration or may be determined by software, such as by operating system 218 of the first mobile device 200. The first charge request may include a desired power allotment corresponding to a power allotment the first mobile device 200 wishes to receive at the time the first charge request is transmitted. The desired power allotment may be based on the charge cycle of the first mobile device 200, for example based on if the first mobile device 200 is at a constant-current position or a constant-voltage position in a constant-current/constant-voltage charge cycle.

The first charge request may include mobile device information. Mobile device information may include, but is not limited to, any one of a mobile device identifier, a user identifier, a current charge level, an available charging time, a runtime context (e.g., applications running on the mobile device), a maximum receivable charge, or a minimum receivable charge. For example, mobile device information may indicate that a user has only 10 minutes available for charging. Other information may be automatically pulled from the first mobile device 200, such as calendar information. Using calendar information, the charging system 100 may determine that the user has a meeting in the room the charging system 100 is located in for a period of one hour. The charging system 100 may consider the calendar information in determining the charge program for the device. For example, if the user will only be in the room for an hour, the charging system 100 may attempt to fully charge the device within that time period. Examples of user identifiers may identify mobile devices belonging to employees or management. Using user identifiers may allow the charging system 100 to provide charge only to, or to prioritize charge, for employees over guests or for managers over other employees. Runtime context may include applications currently running on the mobile device. A charging system user may designate certain applications as "critical" and may set a charging system policy prioritizing charging for devices running applications designated as critical. For example, proprietary software, or email, or streaming video may be designated critical applications. Mobile device information may be determined by the charge request module 214 of the first mobile device 200. The charge request module 214 may communicate or interface with other electronic interfaces and/or software or hardware elements of the first mobile device 200 to request or receive mobile device information. The charge request module 214 may communicate with the communication module 216 to transmit the first charge request to the charging system 100. The first charge request may be transmitted or communicated to the charging system 100 in any suitable method of data transmission, and may be communicated in aggregate or in multiple communications.

While the charging system 100 receives the first charge request from the first mobile device 200, the charging system 100 may receive additional charge requests from the first mobile device 200, although not illustrated. For example, the first charge request may indicate the first mobile device 200 requests a desired power allotment of 10 watts because the battery charge level is low, but when the battery charge level reaches 80%, the first mobile device 200 may transmit another charge request indicating a desired power allotment of 5 watts. Although illustrated as occurring at different points along the vertical time axis, any portion of any of the operations or steps described above may occur at least partially concurrently with any portion of any other operation or step described above.

The charging system 100 may receive the first charge request from the first mobile device 200, and at block 416 of method 410, the charging system 100 may identify one or more charging system policies based at least in part on the first charge request. The one or more charging system policies may be associated with one or more charging rules applicable to the first mobile device 200. The charging system 100 may use the charging policy module 118 to identify the charging policy or policies. The charging system policy may be provided by a charging system user, either locally at the charging system 100 or remotely. For example, a charging system user may input charging policies and/or charging rules at the charging policy configurator 400, which may be pushed or automatically transmitted to the charging system 100. The one or more charging policies may include priority rank information, power allocation information, charging rules, mobile device parameter information, and other related information.

At block 418 of method 410 in FIG. 2, the charging system 100 may determine a first charge program for the first mobile device 200, based at least in part on the first charge request, and the identified charging system policy or policies. The first charge program may include a priority rank and/or power allocation of the first mobile device with respect to other mobile devices connected to the charging system 100. The charging system 100 may use the charge program module 120 to determine the first charge program. The priority rank and/or power allocation may be determined at the charging policy module 118 in one example, or at the charge program module 120 in another example. The priority rank and/or power allocation may be determined by a scoring process, where certain parameters, such as device type or device owner are allocated certain points, and devices with the highest score are prioritized over other devices.

Priority may also be determined based on a length of time a mobile device has been connected to the charging system 100. In one example, if a mobile device indicates it has an available charging time of 10 minutes, after the 10 minutes have passed the mobile device may be assigned lowest priority and charging may stop or be throttled, in order to prevent abuse of time-sensitive charging policies. The first charge program may include charging information specific to the first mobile device 200. For example, the first charge program may include a power allotment for charging, a designated charging time, the priority rank and/or power allocation of the first mobile device 200 with respect to other connected mobile devices, a designated battery charge level (e.g., charge to completion or certain percentage), or other charging information.

In some embodiments, the charging system 100 may consider the available charging capacity of the charging system 100 in determining the first charge program. The available charging capacity may be a total charging capacity or output of the charging system 100 less any charge allocated to connected mobile devices. For example, the charging system 100 may subtract power being drawn from the charging system from the total charging capacity of the charging system 100. In one example, the charging system 100 may have a total charging capacity of 15 watts, and a connected mobile device may be drawing 10 watts from the charging system 100, leaving an available charging capacity of 5 watts. In another embodiment, the charging system 100 may determine a physical position of the first mobile device 200 with respect to the charging system 100, where determining the first charge program of the first mobile device 200 may be based at least in part on the physical position of the first mobile device 200. For example, the charging system 100 may determine the physical position of the first mobile device 200 with respect to the power transmission unit 102. Certain areas of power transmission unit 102 may be associated with certain priority ranks or power allocation amounts. In one instance, high priority charge area 130 of the power transmission unit 102 may indicate that mobile devices positioned at the high priority charge area 130 are to be prioritized with respect to other mobile devices connected to the charging system 100.

At block 420, the charging system 100 may wirelessly charge the first mobile device 200 based at least in part on the first charge program determined at block 418. For example, the charge program module 120 may communicate with the charge distribution module 122 of the power transmission unit 102 to coordinate charging of the first mobile device 200. The charge distribution module 122 may instruct the charging components of the power transmission unit 102 to provide energy to the first mobile device 200. The charging components may include the resonator 132, the power amplifier 134, and the power supply 136 of the power transmission unit 102. In FIG. 3, operation 436 illustrates the charging system 100 charging the first mobile device 200 by providing power to the first mobile device. The first mobile device 200 may receive charge or power from the power transmission unit 102, for example through resonator 220, and may accordingly charge the battery 208 of the first mobile device 200. Although illustrated as occurring at different points along the vertical time axis, any portion of any of the operations or steps described above may occur at least partially concurrently with any portion of any other operation or step described above.

Referring now to FIG. 3, the charging system 100 may establish the second wireless connection 108 with the second mobile device 300. As discussed above with respect to the first wireless connection 106, the second wireless connection 108 may include the communications and/or operations included in exchange 438. Exchange 438 may include a communication from the charging system 100, for example a beacon. The second mobile device 300 may receive the beacon, using any of the above-described hardware and/or the communication module 316 of the second mobile device 300. In response, the second mobile device 300 may transmit a response or confirmation to the charging system 100 during exchange 438 using communication module 316, thereby establishing the second wireless connection 108 with the charging system 100.

At communication 440, the second mobile device 300 may transmit a second charge request to the charging system 100 using communication module 316. The second charge request may include second mobile device information, as discussed above with respect to the first charge request. The charge request module 314 may communicate or interface with other electronic interfaces and/or software or hardware elements of the second mobile device 300 to request or receive mobile device information. The charge request module 314 may communicate with the communication module 316 to transmit the second charge request to the charging system 100. The second charge request may be transmitted or communicated to the charging system 100 in any suitable method of data transmission, and may be communicated in aggregate or in multiple communications.

The charging system 100 may receive the second charge request from the second mobile device 300, and may identify one or more charging system policies based at least in part on the second charge request. The charging system 100 may use the charging policy module 118 to identify the one or more charging policies. In some embodiments, the charging system 100 may poll connected mobile devices for new charge requests, where the new charge requests comprise updated mobile device information. Polling may occur periodically or may be triggered by events, such as upon charge completion notification received from a connected mobile device. For example, the charging system 100 may transmit a request for a third charge request from the first mobile device 200, where the third charge request comprises updated first mobile device information. The charging system 100 may determine a current battery charge level of the first mobile device 200 via the updated first mobile device information included in the third charge request. The charging system 100 may also determine an available charging capacity of the charging system 100, as described above.

Based at least in part on the second charge request and the identified charging system policy or policies, the charging system 100 may determine a second charge program for the second mobile device 300, where the second charge program comprises a priority rank and/or power allocation of the second mobile device 300 with respect to the first mobile device 200 and any other mobile devices connected to the charging system 100. In some embodiments, the second charge program may be determined based at least in part on the third charge request and/or the available charging capacity of the charging system 100. Other embodiments may determine the second charge program based at least in part on any combination of these elements, and may include additional elements. The charging system 100 may use the charge program module 120 to determine the second charge program. The second charge program may include elements similar to the first charge program discussed above. For example, the second charge program may indicate the second mobile device 300 has a higher priority rank and/or power allocation than the first mobile device 200, and will therefore receive the desired power allotment until charge completion. In instances where the second mobile device 300 is determined to receive an amount of power that exceeds the available charging capacity of the charging system 100, the first charge program may be modified to reduce the power allocated to the first mobile device 200. The charging system 100 may redirect the divested power to the second mobile device 300, as it is prioritized. For example, the charge distribution module 122 may determine power is to be reduced to specific mobile devices with lower priority and may instruct the charging system 100 to reduce power to those mobile devices and to increase power to the prioritized mobile device or devices.

Upon determining the second charge program, the charging system 100 may wirelessly charge the second mobile device 300 based at least in part on the first charge program determined at operation 450. The charge program module 120 may communicate with the charge distribution module 122 of the power transmission unit 102 to coordinate charging of the second mobile device 300. The charge distribution module 122 may instruct the charging components of the power transmission unit 102 to provide energy to the second mobile device 300. The charging components may include the resonator 132, the power amplifier 134, and the power supply 136 of the power transmission unit 102. The second mobile device 300 may receive charge or power from the power transmission unit 102, for example through resonator 320, and may accordingly charge the battery 308 of the second mobile device 300. Although illustrated as occurring at different points along the vertical time axis, any portion of any of the operations or steps described above may occur at least partially concurrently with any portion of any other operation or step described above.

The charging system 100 may continue charging the first mobile device 200 as well. In some embodiments, for example where the second mobile device 300 is prioritized with respect to the first mobile device 200, the charging system 100 may determine an updated first charge program for the first mobile device 200. The charging system 100 may charge the first mobile device 200 based at least in part on the updated first charge program at operation 452. In other embodiments, the first charge program may remain unchanged, and the charging system 100 may continue charging the first mobile device 200 at operation 452 in accordance with the first charge program.

Referring still to FIG. 3, at communication 454 the first mobile device 200 may transmit a fourth charge request to the charging system 100, where the fourth charge request may indicate a charge completion or 100% charge level of the battery 208 of the first mobile device 200. The charging system 100 may receive the fourth charge request and may update the first charge program or determine a new charge program for the first mobile device 200 where the updated charge program no longer charges or otherwise provides power to the first mobile device 200 until it drops below a predetermined charge threshold, for example 95% of capacity. The charging system 100 may further update or determine a new second charge program for the second mobile device 300 based at least in part on the fourth charge request, for example at 458. In some embodiments, the charging system 100 may transmit a request for updated information to the second mobile device 300 at communication 456. For example, if the first mobile device 200 was prioritized with respect to the second mobile device 300, and the second mobile device 300 was receiving less than a maximum charge, upon charge completion of the first mobile device 200, the second charge program may be updated to allocate the maximum charge to the second mobile device 300. The charging system 100 may then charge, at 458, the second mobile device 300 at the maximum charge acceptable to the second mobile device.

It should be noted, that the method 410 may be modified in various ways in accordance with certain embodiments of the disclosure. For example, one or more operations of method 410 may be eliminated or executed out of order in other embodiments of the disclosure. Additionally, other operations may be added to method 410 in accordance with other embodiments of the disclosure.

The systems and methods described herein may result in increased functionality or optimal power distribution allocation of charging systems by maximizing use of available capacity of the charging system. In some embodiments, the charging system may allocate power or energy to a mobile device based at least in part on a minimum energy charge requested by the mobile device, and may reallocate power or energy to the mobile device based at least in part on requests made by the device.

Embodiments described herein may be implemented using hardware, software, and/or firmware, for example, to perform the methods and/or operations described herein. Certain embodiments described herein may be provided as one or more tangible machine-readable media storing machine-executable instructions that, if executed by a machine, cause the machine to perform the methods and/or operations described herein. The tangible machine-readable media may include, but is not limited to, any type of disk including floppy disks, optical disks, compact disk read-only memories (CD-ROMs), compact disk rewritable (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware. Additionally, in certain embodiments, a special-purpose computer or a particular machine may be formed in order to identify actuated input elements and process the identifications.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the disclosure have been described in connection with what is presently considered to be the most practical and various embodiments, it is to be understood that the disclosure is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the disclosure, including the best mode, and also to enable any person skilled in the art to practice certain embodiments of the disclosure, including making and using any devices or systems and performing any incorporated methods. The patentable scope of certain embodiments of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

According to example embodiments of the disclosure, there may be a method. The method may include establishing, by a charging system comprising one or more processors, a first wireless connection with a first mobile device, and receiving, by the charging system, a first charge request from the first mobile device, the first charge request comprising first mobile device information. The method may include identifying, by the charging system, one or more charging system policies based at least in part on the first charge request, and determining, by the charging system, a first charge program for the first mobile device based at least in part on the first charge request and the one or more charging system policies, wherein the first charge program comprises a power allocation of the first mobile device with respect to other mobile devices connected to the charging system. The method may include wirelessly charging, by the charging system, the first mobile device, based at least in part on the first charge program.

In some embodiments, the method may include establishing, by the charging system, a second wireless connection with a second mobile device, and receiving, by the charging system, a second charge request from the second mobile device, the second charge request comprising second mobile device information. The method may include identifying, by the charging system, one or more charging system policies based at least in part on the second charge request, and determining, by the charging system, a second charge program for the second mobile device, based at least in part on the second charge request and the one or more charging system policies, wherein the second charge program comprises a power allocation of the second mobile device with respect to the first mobile device and any other mobile devices connected to the charging system. The method may include wirelessly charging, by the charging system, the second mobile device, based at least in part on the second charge program. In some instances, the method may include modifying the first charge program for the first mobile device based at least in part on the second charge program. In some instances, the method may include determining, by the charging system, an available charging capacity of the charging system. The one or more charging system policies may comprise charging rules and the identification of one or more charging system policies identifies charging rules applicable to the first mobile device based at least in part on the first charge request. In some instances, the method may include polling, by the charging system, connected mobile devices for new charge requests, wherein the new charge requests comprise updated mobile device information. In some instances, the method may include determining, by the charging system, a physical position of the first mobile device with respect to the charging system, wherein determining the first charge program of the first mobile device is based at least in part on the physical position of the first mobile device. The first mobile device information of the first charge request may comprise any one of a mobile device identifier, a user identifier, a current charge level, an available charging time, a runtime context, a maximum receivable charge, or a minimum receivable charge. In some instances, the method may include determining, by the charging system, a first length of time of the first wireless connection, and adjusting, by the charging system, the first charge program based at least in part on the first length of time.

In example embodiments of the disclosure, there may be a charging system. The charging system may include at least one memory that stores computer-executable instructions and at least one processor configured to access the at least one memory. The at least one processor may be configured to execute the computer-executable instructions to establish a first wireless connection, receive a first charge request from the first mobile device, the first charge request comprising first mobile device information, and identify one or more charging system policies based at least in part on the first charge request. The at least one processor may be configured to determine a first charge program for the first mobile device based at least in part on the first charge request and the one or more charging system policies, wherein the first charge program comprises a power allocation of the first mobile device with respect to other mobile devices connected to the charging system, and wirelessly charge the first mobile device, based at least in part on the first charge program.

The at least one processor may be further configured to establish a second wireless connection with a second mobile device, receive a second charge request from the second mobile device, the second charge request comprising second mobile device information, and identify one or more charging system policies based at least in part on the second charge request. The at least one processor may be further configured to determine a second charge program for the second mobile device, based at least in part on the second charge request and the one or more charging system policies, wherein the second charge program comprises a power allocation of the second mobile device with respect to the first mobile device and any other mobile devices connected to the charging system, and wirelessly charge the second mobile device, based at least in part on the second charge program. In some embodiments, the at least one processor is further configured to modify the first charge program for the first mobile device based at least in part on the second charge program. In some embodiments, the at least one processor is further configured to determine an available charging capacity of the charging system. The one or more charging system policies comprise charging rules, and the identification of one or more charging system policies identifies charging rules applicable to the first mobile device based at least in part on the first charge request. In some embodiments, the at least one processor is further configured to poll connected mobile devices for new charge requests, wherein the new charge requests comprise updated mobile device information. In some embodiments, the at least one processor is further configured to determine a physical position of the first mobile device with respect to the charging system, wherein determining the first charge program of the first mobile device is based at least in part on the physical position of the first mobile device. The first mobile device information of the first charge request comprises any one of a mobile device identifier, a user identifier, a current charge level, an available charging time, a runtime context, a maximum receivable charge, or a minimum receivable charge. In some embodiments, the at least one processor is further configured to determine a first length of time of the first wireless connection, and adjust the first charge program based at least in part on the first length of time.

In example embodiments of the disclosure, there may be a power distribution apparatus. The power distribution apparatus may include a power supply, a power distribution device configured to wirelessly charge connected mobile devices, at least one memory that store computer-executable instructions and at least one processor configured to access the at least one memory. The at least one processor may be configured to execute the computer-executable instructions to establish a first wireless connection with a first mobile device, receive a first charge request from the first mobile device, the first charge request comprising first mobile device information, and identify one or more charging system policies based at least in part on the first charge request. The at least one processor may be configured to determine a first charge program for the first mobile device based at least in part on the first charge request and the one or more charging system policies, wherein the first charge program comprises a power allocation of the first mobile device with respect to other mobile devices connected to the charging system, and wirelessly charge the first mobile device, based at least in part on the first charge program. The at least one processor may be further configured to establish a second wireless connection with a second mobile device, receive a second charge request from the second mobile device, the second charge request comprising second mobile device information, and identify one or more charging system policies based at least in part on the second charge request. The at least one processor may be further configured to determine a second charge program for the second mobile device, based at least in part on the second charge request and the one or more charging system policies, wherein the second charge program comprises a power allocation of the second mobile device with respect to the first mobile device and any other mobile devices connected to the charging system, and wirelessly charge the second mobile device, based at least in part on the second charge program.

The claimed disclosure is:

1. A method comprising:
    establishing, by a charging system comprising one or more processors, a first wireless connection with a first mobile device, wherein the first mobile device is a first mobile device type that has a first charge capacity;
    receiving, by the charging system, a first charge request from the first mobile device, the first charge request comprising first mobile device information, wherein the mobile device information comprises a first mobile device identifier;
    identifying, by the charging system, one or more charging system policies based at least in part on the first charge request, wherein the one or more charging system policies comprise instructions to charge the first mobile device and a second mobile device of a second mobile device type that has a second charge capacity;
    determining, by the charging system, an available charging capacity of the charging system, wherein the available charging capacity is a total amount of power available to be allocated to charge the first mobile device to the first charge capacity or the second mobile device to the second charge capacity;
    determining, by the charging system, a first charge program for the first mobile device based at least in part on the first charge request and the one or more charging system policies, wherein the first charge program comprises a power allocation of the first mobile device with respect to other mobile devices connected to the charging system; and
    wirelessly charging, by the charging system, the first mobile device, based at least in part on the first charge program, and the available charging capacity of the charging system.

2. The method of claim 1, further comprising:
    establishing, by the charging system, a second wireless connection with the second mobile device;
    receiving, by the charging system, a second charge request from the second mobile device, the second charge request comprising second mobile device information;
    identifying, by the charging system, one or more charging system policies based at least in part on the second charge request;
    determining, by the charging system, a second charge program for the second mobile device, based at least in part on the second charge request and the one or more charging system policies, wherein the second charge program comprises a power allocation of the second mobile device with respect to the first mobile device and any other mobile devices connected to the charging system; and
    wirelessly charging, by the charging system, the second mobile device, based at least in part on the second charge program.

3. The method of claim 2, further comprising modifying the first charge program for the first mobile device based at least in part on the second charge program.

4. The method of claim 1, wherein the one or more charging system policies comprise charging rules; and
    the identification of one or more charging system policies identifies charging rules applicable to the first mobile device based at least in part on the first charge request.

5. The method of claim 1, further comprising polling, by the charging system, connected mobile devices for new charge requests, wherein the new charge requests comprise updated mobile device information.

6. The method of claim 1, further comprising determining, by the charging system, a physical position of the first mobile device with respect to the charging system, wherein determining the first charge program of the first mobile device is based at least in part on the physical position of the first mobile device.

7. The method of claim 1, wherein the first mobile device information of the first charge request comprises any one of, a user identifier, a current charge level, an available charging time, a runtime context, a maximum receivable charge, or a minimum receivable charge.

8. The method of claim 1, further comprising determining, by the charging system, a first length of time of the first wireless connection; and
adjusting, by the charging system, the first charge program based at least in part on the first length of time.

9. A charging system comprising:
at least one memory that stores computer-executable instructions; and
at least one processor configured to access the at least one memory, wherein the at least one processor is configured to execute the computer-executable instructions to:
establish a first wireless connection with a first mobile device, wherein the first mobile device is a first mobile device type that has a first charge capacity;
receive a first charge request from the first mobile device, the first charge request
comprising first mobile device information, wherein the mobile device information comprises a first mobile device identifier;
identify one or more charging system policies based at least in part on the first charge request, wherein the one or more charging system policies comprises instructions to charge the first mobile device and a second mobile device of a second mobile device type that has a second charge capacity;
determine, by the charging system, an available charging capacity of the charging system, wherein the available charging capacity is a total amount of power available to be allocated to charge the first mobile device to the first charge capacity or the second mobile device to the second charge capacity;
determine a first charge program for the first mobile device based at least in part on the first charge request and the one or more charging system policies, wherein the first charge program comprises a power allocation of the first mobile device with respect to other mobile devices connected to the charging system; and
wirelessly charge the first mobile device, based at least in part on the first charge program, and the available charging capacity of the charging system.

10. The charging system of claim 9, wherein the at least one processor is further configured to:
establish a second wireless connection with the second mobile device;
receive a second charge request from the second mobile device, the second charge request comprising second mobile device information;
identify one or more charging system policies based at least in part on the second charge request;
determine a second charge program for the second mobile device, based at least in part on the second charge request and the one or more charging system policies, wherein the second charge program comprises a power allocation of the second mobile device with respect to the first mobile device and any other mobile devices connected to the charging system; and
wirelessly charge the second mobile device, based at least in part on the second charge program.

11. The charging system of claim 10, wherein the at least one processor is further configured to modify the first charge program for the first mobile device based at least in part on the second charge program.

12. The charging system of claim 9, wherein the one or more charging system policies comprise charging rules; and
the identification of one or more charging system policies identifies charging rules applicable to the first mobile device based at least in part on the first charge request.

13. The charging system of claim 9, wherein the at least one processor is further configured to poll connected mobile devices for new charge requests, wherein the new charge requests comprise updated mobile device information.

14. The charging system of claim 9, wherein the at least one processor is further configured to determine a physical position of the first mobile device with respect to the charging system, wherein determining the first charge program of the first mobile device is based at least in part on the physical position of the first mobile device.

15. The charging system of claim 9, wherein the first mobile device information of the first charge request comprises any one of, a user identifier, a current charge level, an available charging time, a runtime context, a maximum receivable charge, or a minimum receivable charge.

16. The charging system of claim 9, wherein the at least one processor is further configured to:
determine a first length of time of the first wireless connection; and
adjust the first charge program based at least in part on the first length of time.

17. A power distribution apparatus comprising:
a power supply;
a power distribution device configured to wirelessly charge connected mobile devices;
at least one memory that stores computer-executable instructions; and
at least one processor configured to access the at least one memory, wherein the at least one processor is configured to execute the computer-executable instructions to:
establish a first wireless connection with a first mobile device, wherein the first mobile device is a first mobile device type that has a first charge capacity;
receive a first charge request from the first mobile device, the first charge request comprising first mobile device information, wherein the mobile device information comprises a first mobile device identifier;
identify one or more charging system policies based at least in part on the first charge request, wherein the one or more charging system policies comprise charging rules, wherein the one or more charging system policies comprises instructions to charge the first mobile device and a second mobile device of a second mobile device type that has a second charge capacity;
determine an available charging capacity of the charging system, wherein the available charging capacity is a total amount of power available to be allocated to charge the first mobile device to the first charge capacity or the second mobile device to the second charge capacity;
determine a first charge program for the first mobile device based at least in part on the first charge request and the one or more charging system policies, wherein the first charge program comprises a power allocation of the first mobile device with respect to other mobile devices connected to the charging system; and wirelessly charge the first mobile device, based at least in part on the first charge program, and the available charging capacity of the charging system.

18. The power distribution apparatus of claim 17, wherein the at least one processor is further configured to:

establish a second wireless connection with the second mobile device;

receive a second charge request from the second mobile device, the second charge request comprising second mobile device information;

identify one or more charging system policies based at least in part on the second charge request;

poll the first mobile device for a third charge request, wherein the third charge request comprises updated first mobile device information;

determine a second charge program for the second mobile device, based at least in part on the second charge request and the one or more charging system policies, wherein the second charge program comprises a power allocation of the second mobile device with respect to the first mobile device and any other mobile devices connected to the charging system; and wirelessly charge the second mobile device, based at least in part on the second charge program.

* * * * *